(12) United States Patent
Cote

(10) Patent No.: US 8,025,799 B2
(45) Date of Patent: Sep. 27, 2011

(54) MAPLE TREE SAP REVERSE OSMOSIS DEVICE

(76) Inventor: Denis Cote, Ham-Nord (CA)

( * ) Notice: Subject to any disclaimer, the term of this patent is extended or adjusted under 35 U.S.C. 154(b) by 410 days.

(21) Appl. No.: 12/258,086

(22) Filed: Oct. 24, 2008

(65) Prior Publication Data

US 2009/0110793 A1 Apr. 30, 2009

Related U.S. Application Data

(60) Provisional application No. 60/982,401, filed on Oct. 24, 2007.

(51) Int. Cl.
*B01D 61/02* (2006.01)
*A23L 2/74* (2006.01)
*A23L 1/09* (2006.01)

(52) U.S. Cl. ............ 210/195.2; 210/652; 210/121; 210/416.1; 426/490

(58) Field of Classification Search ............ 210/195.2, 210/652, 121, 416.1, 490
See application file for complete search history.

(56) References Cited

U.S. PATENT DOCUMENTS

| 3,861,695 A * | 1/1975 | Shourek et al. ............ 280/5.24 |
| 5,785,504 A * | 7/1998 | Cote ............................ 417/313 |
| 2005/0269131 A1 * | 12/2005 | Streicher et al. ............ 175/17 |

FOREIGN PATENT DOCUMENTS

| CA | 1112581 | 11/1981 |
| CA | 2513788 | 1/2007 |

* cited by examiner

*Primary Examiner* — Nam X Nguyen
*Assistant Examiner* — Denise R Anderson

(57) ABSTRACT

A maple sap reverse osmosis device has a support rack configured and sized to rest atop a tank. The support rack supporting a reverse osmosis device. The reverse osmosis device has a pump line and a dump line both located within the tub. The pump line being located at an upper region of the tank. A pumping means to pump the maple sap from the pump line. The pumping means pushing maple sap through an osmosis membrane. The dump pipe purging concentrate resulting from sap not passing through the osmosis membrane into the deepest region of the tub.

13 Claims, 9 Drawing Sheets

PRIOR ART

MAPLE TREE SAP REVERSE OSMOSIS DEVICE

This application claims priority base on U.S. provisional 60/982,401 filed Oct. 24, 2007

FIELD OF THE INVENTION

The present invention relates generally to maple tree sap but more particularly to sap device that processes that sap into syrup.

BACKGROUND OF THE INVENTION

Collecting the sap of maple trees to make maple syrup and other derivative products has been known for centuries by North-American Indians and more recently, it has been eagerly taken over by the colonists and is now a thriving industry in the north east United States and south east of Canada. Like most industry, it has to modernize in order to remain profitable and a number of inventions have automated the process.

That is why, over the years, various systems have been used to improve the production of maple syrup. The most expensive and time consuming part of the process of making maple syrup has to do with the boiling of the sap so as to create the sugary concentrate—the maple syrup.

It has been found that by using reverse osmosis, a more concentrated sap can be produced, which requires less boiling time, thus a saving in energy cost. Reverse osmosis for the purpose of filtering water has been known for decades and by discarding the pure water and keeping the concentrate, an improved process for making maple syrup was born.

The prior art shows several systems whether for water desalination or water purification. Although none of the systems were developed specifically for the maple syrup industry, similar systems are currently in use in that industry. The major drawback is that those systems work on high voltage (240V) and require up to 50 amps. The high voltage and amperage is to operate the high pressure pumps. The systems are quite huge, heavy and bulky. Moreover, they require to be located where they won't be in a temperature below freezing.

By its very nature, the maple syrup industry remains mostly a small scale business and many small producers cannot afford the large equipment that larger producers can. There is therefore a need for smaller efficient and low cost devices to make the processing of maple sap profitable even for small producers.

SUMMARY OF THE INVENTION

In view of the foregoing disadvantages inherent in the known devices now present in the prior art, the present invention, which will be described subsequently in greater detail, is to provide objects and advantages which are:

To provide for a device that is quick to install on site. That is simple to use; That does not take up much space; That does not require a heated location to operate in; That easily adapts to any maple sap tank size; That Works at low pressure; That works on regular 110-120 volts AC; That uses only one tank for both the sap and the concentrate; That reduces operating costs by 50% or more.

In order to do so, the invention comprises most of the components usually found on larger machines but in smaller size and with a unique system of a two step pumping system that allows for the use of a single tank instead of three, the use of low cost low pressure pumps. Moreover, the maple sap reverse osmosis device has a support rack configured and sized to rest atop a tank. In this art, both osmosis membranes and nanofiltration membranes are used. For the sake of simplicity, the term membrane is used throughout as well as reverse osmosis device. Also, the membrane itself is housed in a module, known hereinafter as "module" to differentiate it from the osmosis membrane itself.

The support rack supporting a reverse osmosis device. The reverse osmosis device has a pump line and a dump line both located within the same tank. The pump line is located at an upper region of the tank. A pumping means to pump the maple sap from the pump line. The pumping means pushes maple sap towards a module containing the osmosis membrane. The dump pipe purges concentrate, resulting from sap by-passing the membrane—that is, passing into the module but not passing through the osmosis membrane—and into the deepest region of the tank.

More specifically, the pumping means is a feed pressure pump consisting of a rotary vane pump.

The pumping means is a feed pressure pump capable of sustaining a pressure of between 200 and 300 psi.

The pump line has a float so that it pumps only sap water located at the top of the sap contained in the tank, which determines the upper region of the tank.

The pumping means takes the sap from the tank and brings the pressure between 200 to 270 psi at a volume of between 1.66 to 5 gallons per minute The pressure of between 200 to 270 psi pushes the sap through a 5 to 10 micron filter located between the feed pump and the osmosis membrane. The sap is piped through to the recirculating pump having a capacity of between 14 to 75 GPM at 28 PSI so as to increase pressure to between 228 to 298 psi. The recirculating pump pushes the sap towards the membrane which results in pure water passing through the membrane and concentrate resulting from sap by-passing the membrane. A restrictor, located down line from the osmosis membrane and before the recirculation pump provides additional pressure necessary for reverse osmosis pressure. Pure water resulting from the reverse osmosis process is sent away. Away meaning that it is either disposed of or stored in a water suitable container. Concentrate resulting from sap not passing through the osmosis membrane is poured directly at the bottom of the tank by way of the dump line. The pump line and the dump line are at opposite ends of the tank. The dump pipe pours its content proximal a tank outlet located at the bottom of the tank, and the tank outlet leads directly to an evaporator.

There are variations in the embodiments for other pressure and volume values.

The restrictor provides a pressure drop of 16 psi.

After concentration of maple sap, there is a method of quick rinsing the reverse osmosis device that does require a lot less volume of pure water for rinsing. Because of the efficient draining before rinsing due to a series of valves optimally located facilitate quick and easy draining. The draining and rinsing consists of following steps:

Disconnecting the pump line and the dump line.

Opening all valves to recuperate the concentrate and draining the system.

Shutting all the valves.

Running a small amount of pure water through to quick rinse the system, that is the reverse osmosis device.

Opening all valves and draining the reverse osmosis device;

Running the pumping means a few seconds to drain it so that there is no water that could cause damage to all the components of the system when temperature drops below freezing. With no water, no freezing damage can occur.

Optionally, a washing step can be inserted into the preceding method wherein, following the step of rinsing and draining, shutting all the valves, admixing soap with water and running through the system. Opening all valves and drain. Run water to rinse the system and let the water drain. Run the pumping means a few seconds to drain it.

There is also a method of restarting the reverse osmosis device, even if frozen, which consists in the steps of:
  Connecting the pump line and the dump line.
  Warming up the feed pressure pump;
  Starting the feed pressure pump; until sap comes out of a first valve
  Note: the water flow will defrost the balance of residual frozen water left in the reverse osmosis device.
  Repeating the sequence of shutting valves after sap comes out from any given valve.

Preferably, the support rack has a telescopic handle capable of adapting and locking in to a variety of tank sizes. Also, the support rack is movable by way of a set of wheels.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

DETAILED DESCRIPTION

Figure 1:
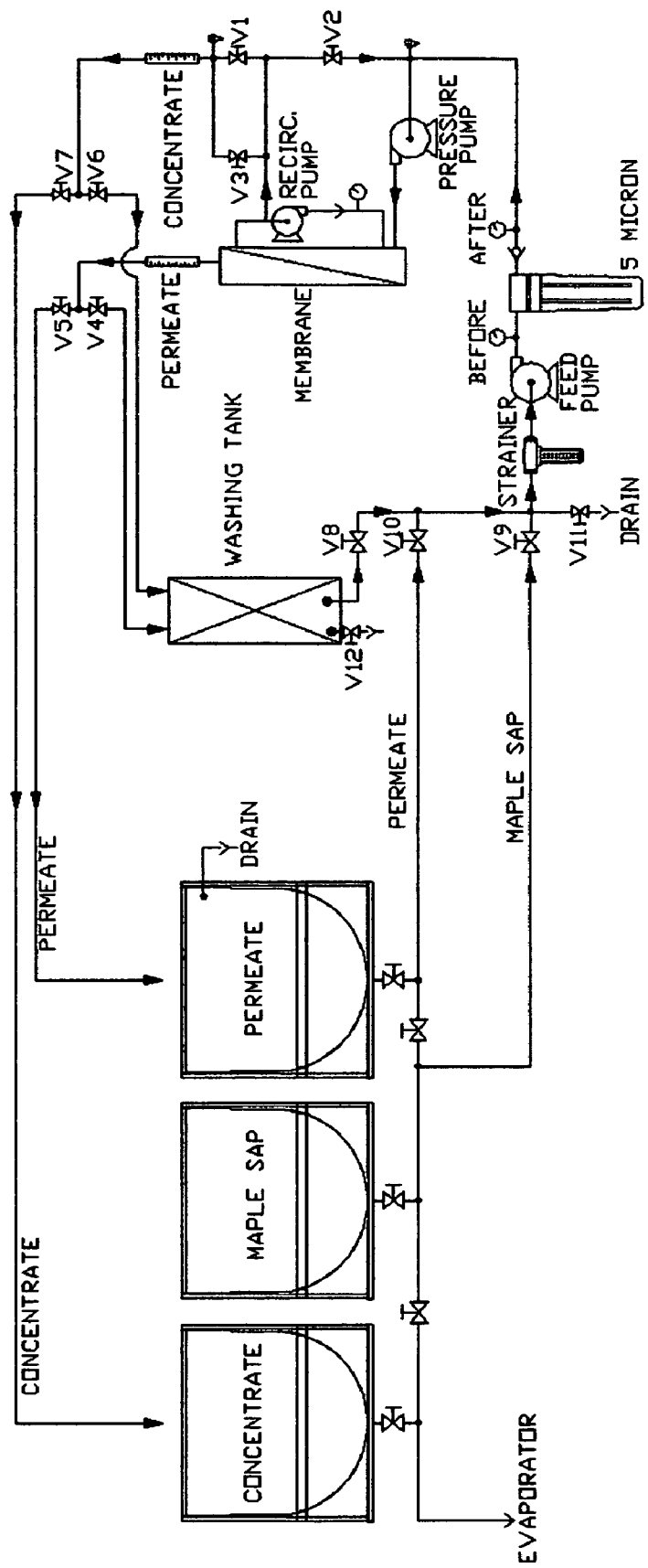
FIG. 1 Schematic view of an installation with system of the prior art.
Figure 2:
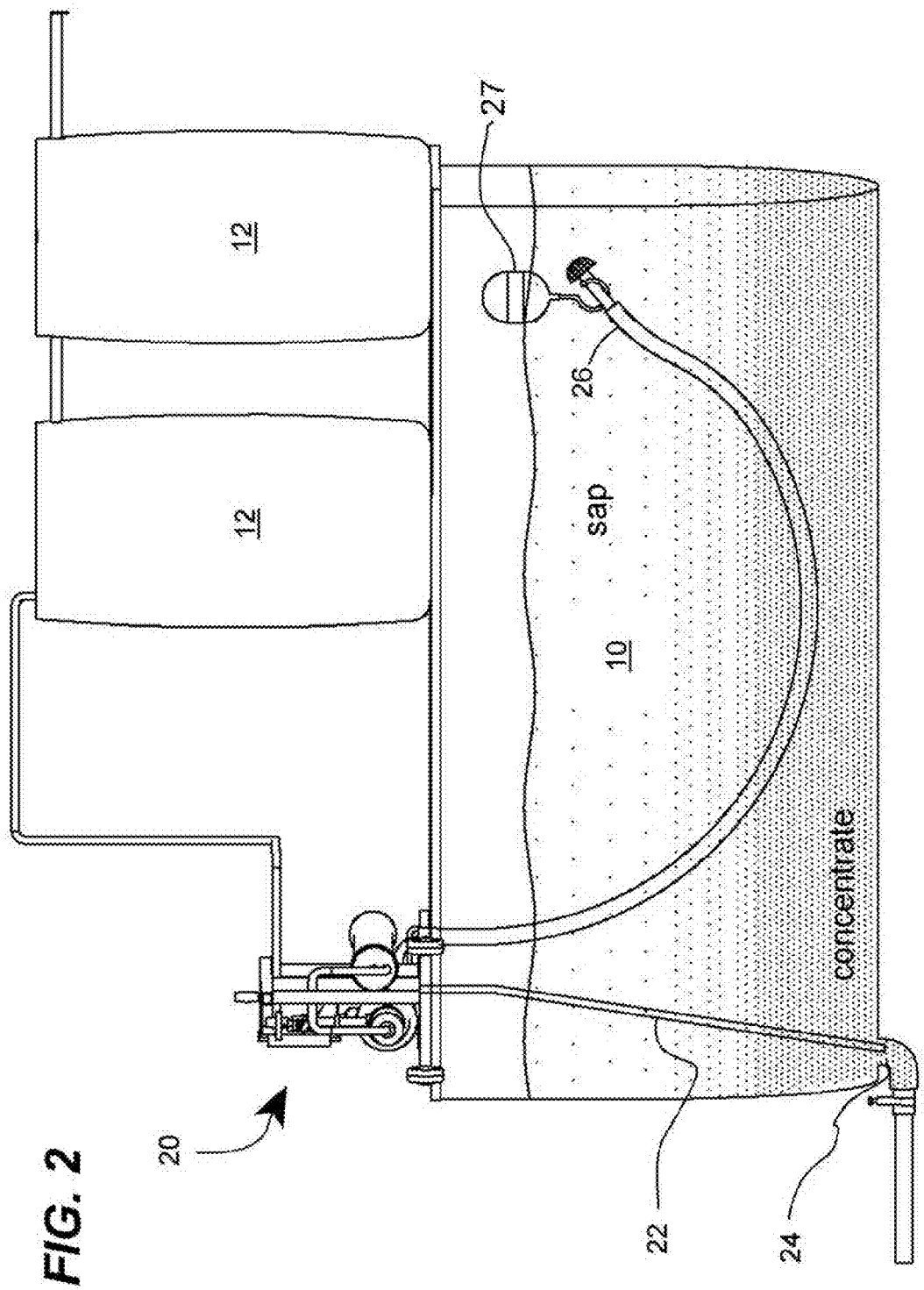
FIG. 2 Side view of an installation of this invention.
Figure 3:
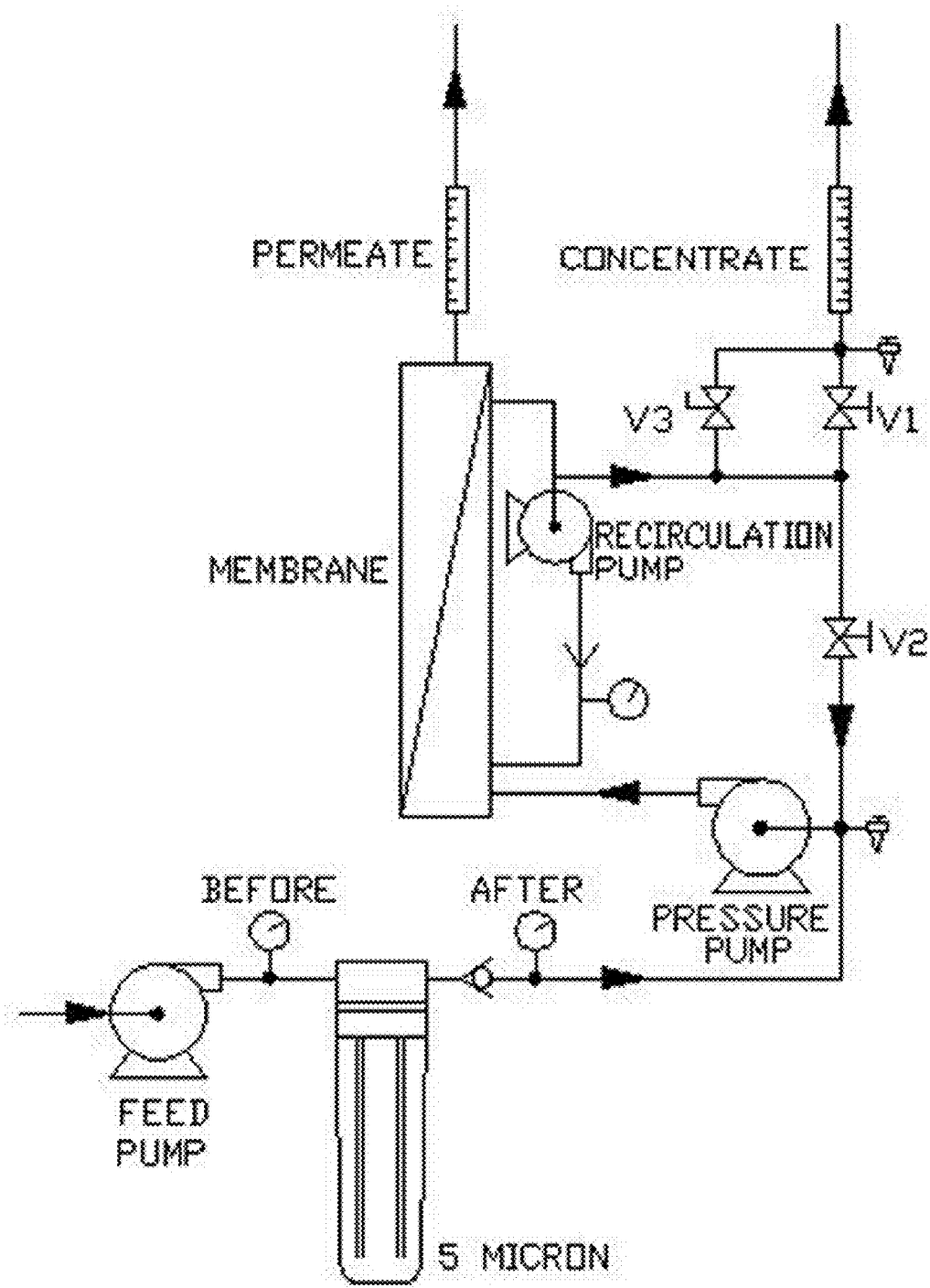
FIG. 3 Schematic detail of FIG. 1.

A maple sap reverse osmosis device (20) has a filter (1) a pumping means, also known as feed pressure pump (2), at least one osmosis membrane (3), a recirculating pump (4). In a preferred embodiment, the filter (1) is a 5 micron filter which is most appropriate for this specific task. Also, the housing for this filter (1) has to be sturdy so as to take on a pressure that is higher than that of the prior art since the device described herein uses a higher pressure at this stage. The feed pressure pump (2) configured so as to be capable of sustaining a pressure of about 250 psi. This insures that it is no longer necessary to use a conventional feed pump as is done in the prior art. The feed pressure pump (2) actually performs the function normally done with two pumps (feed pump and pressure pumps) in prior art systems. Hence the higher pressure at this stage. In order to keep costs low for the small entrepreneur, the maple sap reverse osmosis device (20) uses the most economical components. For example, the feed pressure pump (2) is a low cost, 120 volts, highly efficient rotary vane pump. The pump has the advantage of not warming up the sap, since a warm sap could cause the proliferation of bacteria and thus be harmful to the resulting maple syrup's quality.

The prior art uses a 4 in membrane capable of a capacity of 150 GPH at 500 psi. In a preferred embodiment, the osmosis membrane (3) is used at a rate of 100 GPH at 250 psi. This lower pressure allows for the use of the low cost feed pressure pump (2) described hereinabove and which is typically able of a maximum capacity of 250 psi. The advantage of using a lower 250 psi over the more conventional 500 psi is that the osmosis membrane (3) has a lesser tendency to foul at the lower pressure. The other advantage, the use of low pressure membrane housing reduces the cost of this one significantly, up to 4 times, the same economic advantages apply to the cost of plumbing parts which are less expensive when rated at low pressure.

Figure 8:
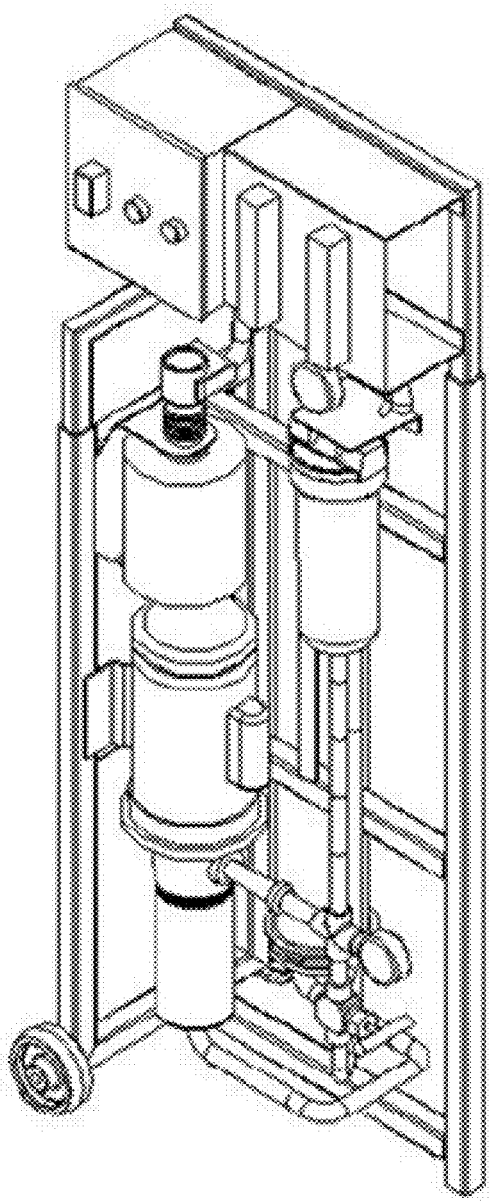
FIG. 8 Isometric view of the invention when it is in a vertical configuration.

An electrical control box (6) contains all the electronics and electrical components which are similar to those found on devices of the prior art. Also, flow meter gauges (7) give a visual indication of the permeate and the concentrate. All the components are held together on a support rack (9) which is comprised of a telescopic handle (5) which changes the overall length of the support rack (9) and locks in place when the adequate length is obtained so that it can adapt to a variety of tank (10) sizes. To make the device truly mobile, the support rack (9) can act as a hand truck that is easily movable by way of a set of wheels (8). In the alternate embodiment as seen in FIG. 8, by simply moving the electrical control box (6), the flow meters (7) and filter (1) the maple sap osmosis device (20) can be used vertically, which make it usable in a fashion similar to that of FIG. 1.

In order to operate, depending upon a variety of factors such as the size and capacity of the feed pressure pump (2), the size of the membrane (3) and so on, different pressures and volumes will be required and obtained.

EXAMPLE 1

A system that operates at 100 GPH (one 4" membrane) with a 75% recovery, the device takes sap from the tank (10) and passes it through the feed pressure pump (2) which brings the pressure to between 200 and 270 psi at a volume of 1.66 gallons per minute. This pressure is strong enough to push the sap through the filter (1) (since this pressure is higher than in the prior art, the filter housing has to be made stronger) this filter must support that high pressure) which is used for removing all the suspended particles which would unnecessarily foul the osmosis membrane (3).

The sap is then piped through to the recirculating pump (4) with a capacity of 16 GPM at 28 PSI which increases the pressure by an additional 28 psi.—The recirculating pump (4), besides the function described hereinabove, also provides constant motion of sap tangentially on the surface of the osmosis membrane (3) at 16 GPM with a pressure drop on the osmosis membrane (3) of 12 PSI so as to reduce the fouling factor on the osmosis membrane (3). An optional restrictor (11) located just outside the osmosis membrane (3), where the concentrate comes out, creates a pressure drop of 16 PSI so that the 12 PSI pressure drop at the membrane along with the 16 PSI from the restrictor (11) adds 28 PSI to the 200 to 270 PSI of the pressure pump (2) for a total of between 228 to 298 PSI, at the inlet of the osmosis membrane (3), which is sufficient to push the sap through the osmosis membrane (3), all the while protecting the membrane from too strong a flow rate and efficiently separating the sugar from the water. Moreover, the recirculating pump (4) increases the volume to around 16 gallons per minute at a pressure of around 28 psi within the osmosis membrane (3). Every psi gain achieved in a low pressure system is important in improving system performance.

EXAMPLE 2

A system that operates at 200 GPH (two 4" membranes in series) with a 75% recovery, the device takes sap from the tank (10) and passes it through the feed pressure pump (2) which brings the pressure to between 200 and 258 psi at a volume of between 3,33 gallons per minute. This pressure is strong enough to push the sap through the filter (1) which is used for removing all the suspended particles which would unnecessarily foul the osmosis membrane (3).

The sap is then piped through to the recirculating pump (4) with a capacity of 16 GPM at 40 PSI which increases the pressure by an additional 40 psi.—The recirculating pump (4), besides the function described hereinabove, also provides constant motion of sap tangentially on the surface of the osmosis membrane (3) at 16 GPM with a pressure drop on the two osmosis membranes (3) of 24 PSI so as to reduce the fouling factor on the osmosis membrane (3). An optional restrictor (11) located just outside the osmosis membrane (3), where the concentrate comes out, creates a pressure drop of 16 PSI so that the 24 PSI pressure drop at the two membrane along with the 16 PSI from the restrictor (11) adds 40 PSI to the 200 to 258 PSI of the pressure pump (2) for a total of between 240 to 298 PSI.

EXAMPLE 3

A system that operates at 300 GPH (one 8" membrane) with a 75% recovery, the device takes sap from the tank (10) and passes it through the feed pressure pump (2) which brings the pressure to between 200 and 270 psi at a volume of 5 gallons per minute. This pressure is strong enough to push the sap through the filter (1) (this filter must support that high pressure) which is used for removing all the suspended particles which would unnecessarily foul the osmosis membrane (3).

The sap is then piped through to the recirculating pump (4) with a capacity of 65 to 75 GPM at 28 PSI which increases the pressure by an additional 28 psi.—The recirculating pump (4), besides the function described hereinabove, also provides constant motion of sap tangentially on the surface of the osmosis membrane (3) at 65 to 75 GPM with a pressure drop on the osmosis membrane (3) of 12 PSI so as to reduce the fouling factor on the osmosis membrane (3). An optional restrictor (11) located just outside the osmosis membrane (3), where the concentrate comes out, creates a pressure drop of 16 PSI so that the 12 PSI pressure drop at the membrane along with the 16 PSI from the restrictor (11) adds 28 PSI to the 200 to 270 PSI of the pressure pump (2) for a total of between 228 to 298 PSI.

Continuing with EXAMPLE 1, the permeate, which is obtained at the rate of 1.245 GPM is pure water, passes through the osmosis membrane (3) and is sent away or in a container (12) to provide clean water for rinsing the osmosis device (20). Any extra water is disposed of. The concentrate which is obtained at the rate of 0.415 GPM is directed towards outlet (24) leading to the evaporator (not shown) for further processing.

When the concentrate is not directed to the evaporator (not shown) it remains in the tank (10) and settles at the bottom of it because it is denser than sap and therefore, it will settle at the bottom and not readily mix with the lighter sap. By providing the pump line (26) with a float (27), only to top, that is the sap, is pumped into the system. The benefit of doing this is that only one tank is needed instead of two as per the prior art. Concentrate at bottom and maple sap at top instead of one tank for concentrate and one for maple sap.

The maple sap osmosis device (20) has a method of operation which consists of the following steps:

Sap is pumped from the tank (10) into the osmosis device (20) by way of a pump line (26). The resulting concentrate is poured directly into an open outlet (24) located at the bottom of that same tank (10) by way of a dump line (22). The configuration is such that the pump line (26) and the dump line (22) are at opposite ends of that same tank (10).

With the use of a single tank (10) and taking the sap from one extremity of the tank (10) by way of an intake pipe (26), the sap is processed through the maple sap osmosis device (20), and then the concentrate, by way of an outlet pipe (22), is poured into a tank outlet (24), and the tank outlet (24) leads directly to an evaporator (not shown).

Even if the evaporator (not shown) is not in function, the osmosis device (20) can still be in function and make concentrate since the connection between the concentrate outlet pipe (22) and the tank outlet (24) is not a closed connection but rather an open connection, which means that the concentrate will remain at the bottom of the tank (10) until the tank outlet (24) is opened to feed the evaporator (not shown) if it is in operation. When the evaporator enters in function, it will siphon the concentrate directly from the outlet pipe (22), which is located proximal the tank outlet (24). If the evaporator consumes more than the osmosis system (20) can provide, it can be supplemented with the concentrate already present at the bottom of the tank (10). With this system, using only one tank (10) instead of, as per the prior art of FIG. 1, using one concentrate tank (10') and one sap tank (10"), there is no need to monitor the level of the concentrate in the single tank (10), especially if the evaporator boils more liquid than the produced concentrate coming from the osmosis system (20). Also, with this process, the tank (10) can be continually filled with new sap.

After concentration of maple sap, there is a method of quick rinsing the reverse osmosis device (10) that does require a lot less volume of pure water for rinsing. Because of the efficient draining before rinsing due to a series of valves optimally located to facilitate quick and easy draining. The draining and rinsing consists of following steps:

- Draining the reverse osmosis device (10) by disconnecting the pump line (26) and the dump line (22).
- Opening all valves (28) to recuperate the concentrate and draining the system.
- Shutting all the valves (28).
- Running pure water through the reverse osmosis device (20).
- Draining the reverse osmosis device (20) by opening all valves (28).
- Running the feed pressure pump (2) a few seconds to drain it, so that there is no water that could cause damage to all the components of the system when temperature drops below freezing. With no water, no freezing damage can occur.

There is also a method of restarting the reverse osmosis device (20) even if frozen which consists in the steps of:

- Connecting the pump line (26) and the dump line (22).
- Warming up the feed pressure pump (2).
- Starting the feed pressure pump (2) until sap comes out of a first valve (28).
- Repeating the sequence of shutting valves (28) after sap comes out from any given valve (28).

Figure 9:
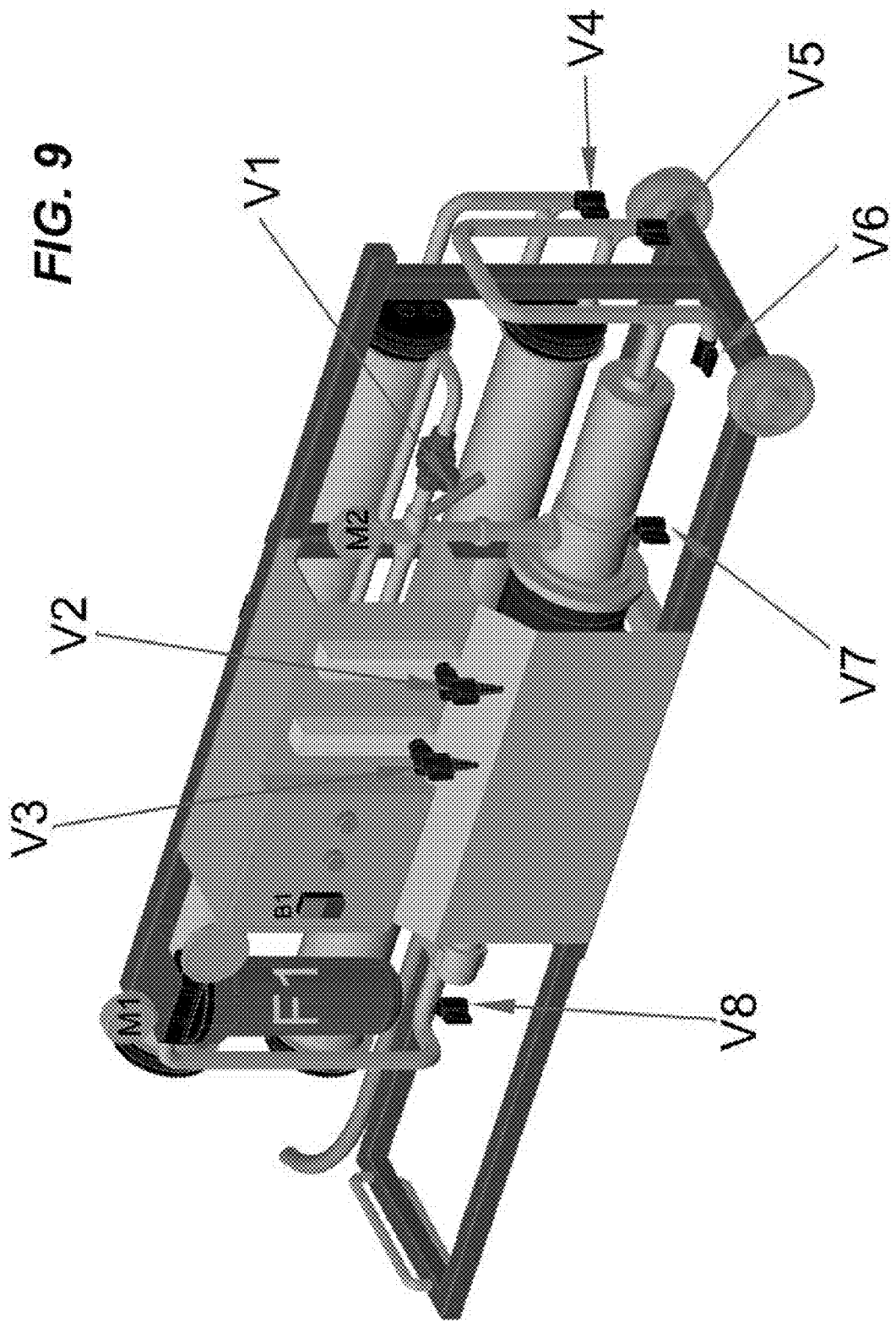
FIG. 9 Isometric view of the invention showing the eight valves.

There is a valve before an after each component of the reverse osmosis device (20), for a total of eight, as shown in FIG. 9, including one underneath each of the two flow meter gauges (7).

Figure 4:
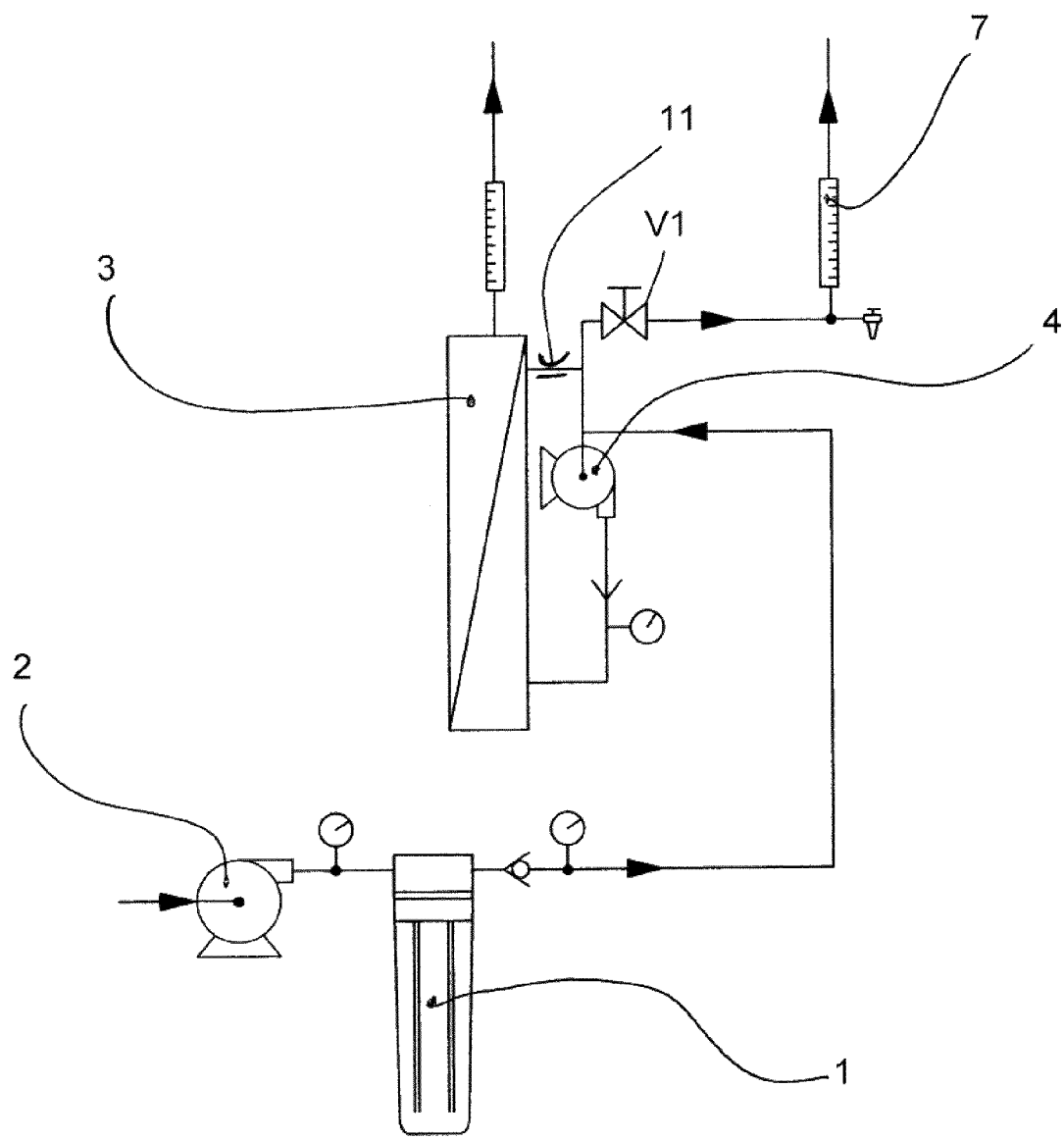
FIG. 4 Schematic detail of FIG. 2.
Figure 5:
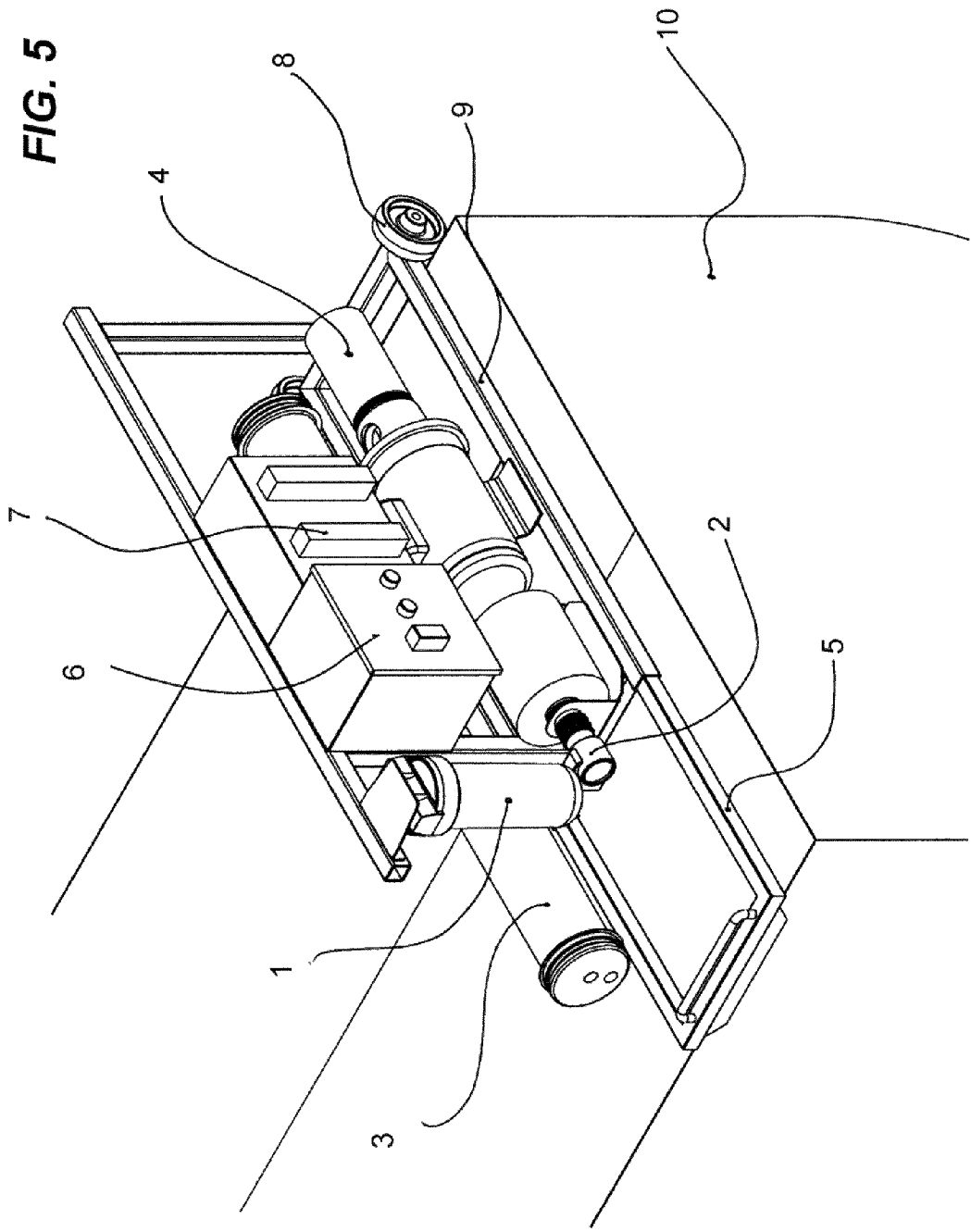
FIG. 5 Isometric view of the invention.
Figure 6:
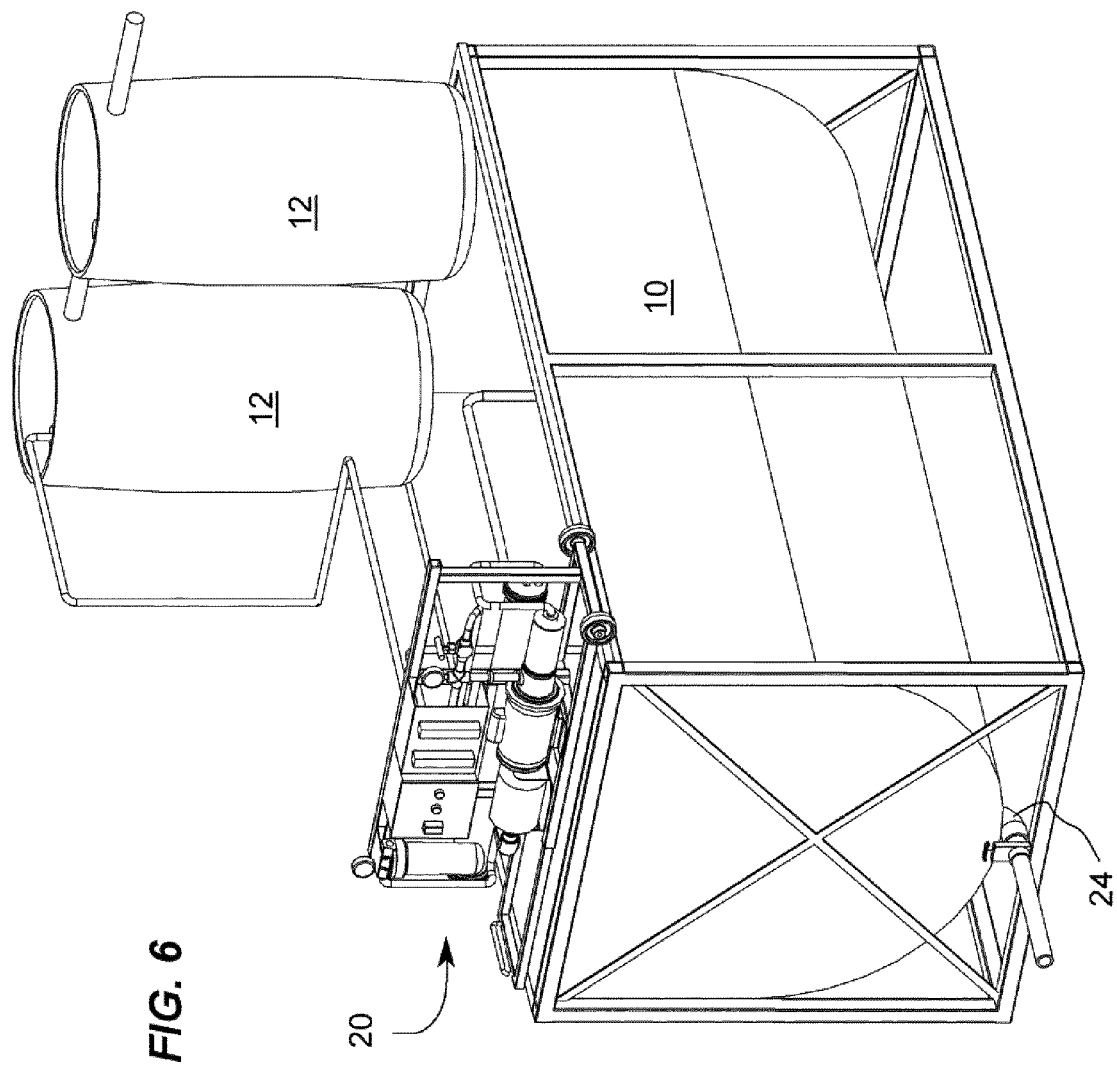
FIG. 6 Isometric view with the complete system.
Figure 7:
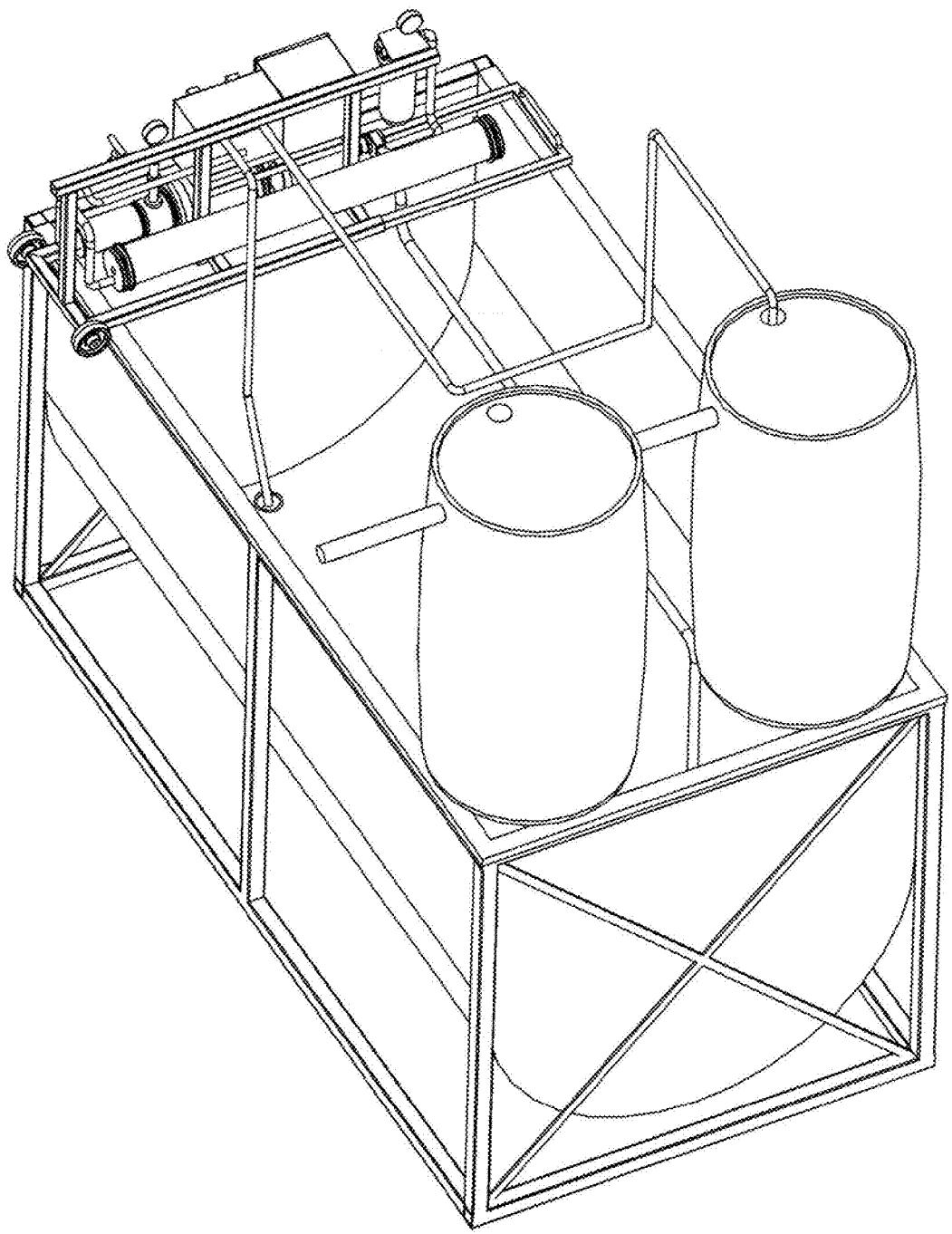
FIG. 7 Isometric reverse angle view of FIG. 6.

Balancing flow between concentrate and pure water is done by using valve V1, as shown in FIGS. 4 and 9.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A maple sap reverse osmosis device comprising:
    a support rack configured and sized to rest atop a tank;
    the support rack supporting a reverse osmosis device;
    the reverse osmosis device has a pump line and a dump line both located within the same tank;
    the pump line being located at an upper region of the tank;
    a pumping means to pump the maple sap from the pump line;
    the pumping means pushing maple sap towards an osmosis membrane;
    a recirculating pump to process the sap inside a module;
    the dump pipe purging concentrate, resulting from sap that has passed through the module, into a deepest region of the tank.

2. A maple sap reverse osmosis device as in claim 1 wherein:
    the pumping means is a feed pressure pump consisting of a rotary vane pump.

3. A maple sap reverse osmosis device as in claim 1 wherein:
    the pumping means is a feed pressure pump capable of sustaining a pressure of between 200 and 270 psi.

4. A maple sap reverse osmosis device as in claim 1 wherein:
    the pump line has a float so that it pumps only sap water located at the top of the sap contained in the tank, which determines the upper region of the tank.

5. A maple sap reverse osmosis device as in claim 1 having a method of operation consisting in the steps of:
    the pumping means takes the sap from the tank and brings the pressure between 200 to 270 psi at a volume of 1.66 gallons per minute;
    the pressure of between 200 to 270 psi pushes the sap through a 5 to 10 micron filter located between the feed pump and the osmosis membrane;
    the sap is piped through to the recirculating pump having a capacity of between 14 to 16 GPM at 28 PSI so as to increase pressure to between 228 to 298 psi;
    the recirculating pump pushes the sap towards the membrane which results in pure water passing through the membrane and concentrate resulting from sap by-passing the osmosis membrane;
    pure water resulting from passing through the osmosis membrane is sent away;
    concentrate being poured directly at the bottom of the tank by way of the dump line;
    the pump line and the dump line are at opposite ends of the tank;
    the dump pipe pours its content proximal a tank outlet located at the bottom of the tank; and
    the tank outlet leads directly to an evaporator.

6. A maple sap reverse osmosis device as in claim 1 using two 4" modules in series having a method of operation consisting in the steps of:
    the pumping means takes the sap from the tank and brings the pressure between 200 and 258 psi at a volume of between 3.33 gallons per minute;
    the pressure of between 200 to 258 psi pushes the sap through a 5 to 10 micron filter located between the feed pump and the osmosis membrane;
    the sap is piped through to the recirculating pump having a capacity of 16 GPM at 40 PSI so as to increase pressure to between 240 to 298 psi;
    the recirculating pump pushes the sap towards the membrane which results in pure water passing through the membrane and concentrate resulting from sap by-passing the osmosis membrane;
    pure water resulting from passing through the osmosis membrane is sent away;
    concentrate being poured directly at the bottom of the tank by way of the dump line;
    the pump line and the dump line are at opposite ends of the tank;

the dump pipe pours its content proximal a tank outlet located at the bottom of the tank; and the tank outlet leads directly to an evaporator.

7. A maple sap reverse osmosis device as in claim 1 using one 8" module having a method of operation consisting in the steps of:

the pumping means takes the sap from the tank and brings the between 200 and 270 psi at a volume of 5 gallons per minute;

the pressure of between 200 to 270 psi pushes the sap through a 5 to 10 micron filter located between the feed pump and the osmosis membrane;

the sap is piped through to the recirculating pump having a capacity of between 65 to 75 GPM at 28 PSI so as to increase pressure to between 228 to 298 psi;

the recirculating pump pushes the sap towards the membrane which results in pure water passing through the membrane and concentrate resulting from sap by-passing the osmosis membrane;

pure water resulting from passing through the osmosis membrane is sent away;

concentrate being poured directly at the bottom of the tank by way of the dump line;

the pump line and the dump line are at opposite ends of the tank;

the dump pipe pours its content proximal a tank outlet located at the bottom of the tank; and the tank outlet leads directly to an evaporator.

8. A maple sap reverse osmosis device as in claim 5 wherein a restrictor located after the membrane and before the recirculation pump provides a pressure drop of 12 to 18 psi.

9. A method of rinsing the reverse osmosis device of claim 1 consisting in the steps of:

disconnecting the pump line and the dump line;

opening all valves to recuperate the concentrate and draining the system;

shutting all the valves;

running a small amount of pure water through to quick rinse the reverse osmosis device;

opening all valves and draining the reverse osmosis device;

running the pumping means a few seconds to drain it so that there is no water left.

10. A method of rinsing the reverse osmosis device of claim 9 wherein:

following the step of rinsing and draining, shutting all the valves;

admixing soap with water and running through the system;

dump through drain pipe;

run water to rinse the system and dump through drain pipe;

opening all valves and drain;

running the pumping means a few seconds to drain it.

11. A method of restarting the reverse osmosis device of claim 1 consisting in the steps of:

connecting the pump line and the dump line;

warming up the pumping means (pressure pump) for defrosting starting the pumping means until sap comes out of a first valve;

repeating the sequence of shutting valves after sap comes out from any given valve.

12. A maple sap reverse osmosis device as in claim 1 wherein:

the support rack has a telescopic handle capable of adapting and locking in to a variety of tank sizes.

13. A maple sap reverse osmosis device as in claim 1 wherein:

the support rack is movable by way of a set of wheels.

* * * * *